United States Patent [19]

Müller

[11] Patent Number: 5,093,941
[45] Date of Patent: Mar. 10, 1992

[54] TRANSPORTABLE, DISASSEMBLABLE CABIN

[76] Inventor: Harald G. Müller, Frankfurther Strasse 25, 6200 Wiesbaden, Fed. Rep. of Germany

[21] Appl. No.: 598,042

[22] Filed: Oct. 16, 1990

[30] Foreign Application Priority Data

Oct. 19, 1989 [DE] Fed. Rep. of Germany ....... 3934847

[51] Int. Cl.$^5$ ........................ A47K 4/00; A47K 11/02
[52] U.S. Cl. ........................................... 4/479; 4/483; 4/484; 52/79.1
[58] Field of Search ............. 4/479, 460, 463, 482, 4/462, 476; 264/528; 52/34, 79.1, 248, 35, 79.1, 79.5, 79.9

[56] References Cited

U.S. PATENT DOCUMENTS

| | | | |
|---|---|---|---|
| 2,120,838 | 6/1938 | Lawrence | 52/248 X |
| 2,247,836 | 7/1941 | Goldbeck | 52/248 X |
| 2,260,307 | 10/1941 | Ferris | 52/248 X |
| 2,650,368 | 9/1953 | Evans | 52/34 |
| 3,778,528 | 12/1973 | Heifetz et al. | 52/79.1 |
| 3,828,965 | 8/1974 | Yarbrough | |
| 4,031,572 | 6/1977 | Harding | |
| 4,065,885 | 1/1978 | Blick, III et al. | 4/460 |
| 4,233,692 | 11/1980 | Sinsley | |
| 4,305,164 | 12/1981 | Sargent et al. | 4/463 |
| 4,831,671 | 5/1989 | Harding | 4/460 |
| 4,966,543 | 10/1990 | Krishnakumar et al. | 264/523 X |

FOREIGN PATENT DOCUMENTS

| | | |
|---|---|---|
| 3033812 | 4/1982 | Fed. Rep. of Germany . |
| 85202142 | 10/1985 | Fed. Rep. of Germany . |
| 2576951 | 8/1986 | France . |

Primary Examiner—Daniel M. Yasich
Attorney, Agent, or Firm—Killworth, Gottman, Hagan & Schaeff

[57] ABSTRACT

A transportable, disassemblable lavatory cabin is provided and includes a plurality of wall segments, optional ceiling and floor segments, and at least one tension strap extending around the exterior of the wall segments to provide a stable, closed construction which can be assembled quickly and without the need for tools. To facilitate the manufacture, transportation, and installation of the cabin, as well as to permit mass production, the wall segments are at least partially manufactured as demoldable, hollow blow moldings with substantially the same outer ground plan. This permits the wall segments to be stacked for easy transportation. Each of the wall segments is manufactured to have a first wall part which is substantially straight on its outside in ground plan and at least one second wall part firmly connected to the first wall part and preferably formed at an angle of 60° thereto.

27 Claims, 4 Drawing Sheets

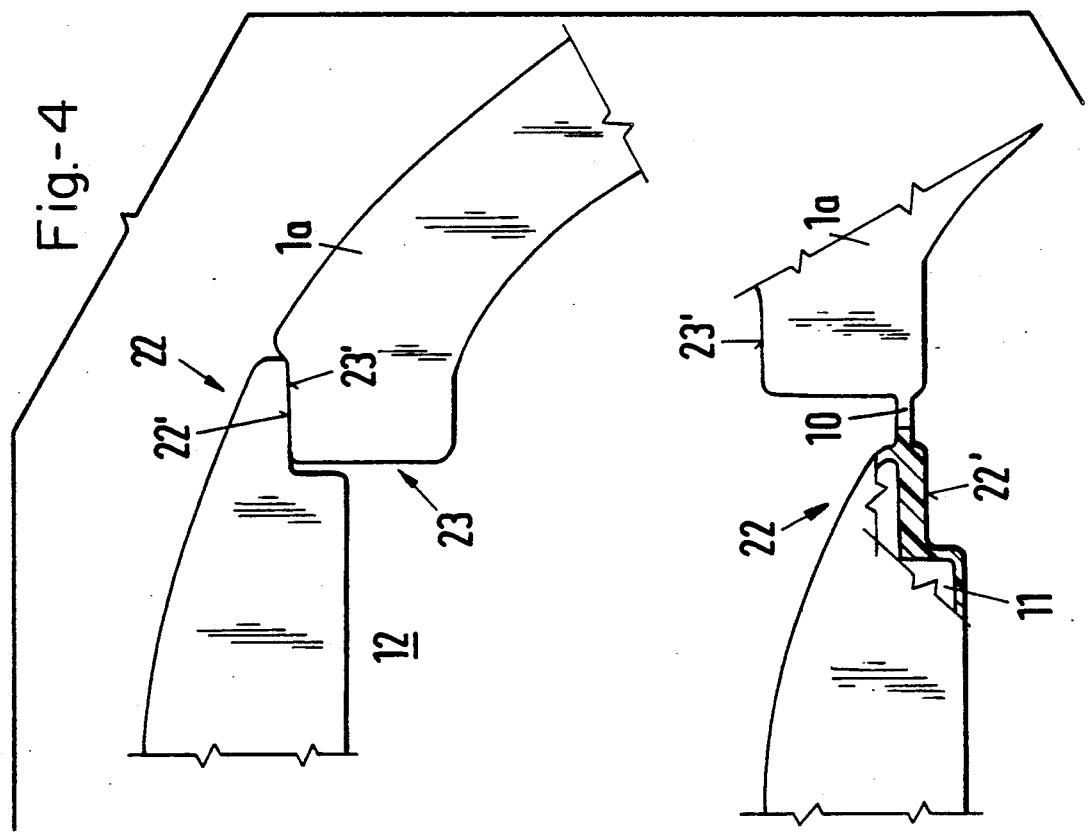
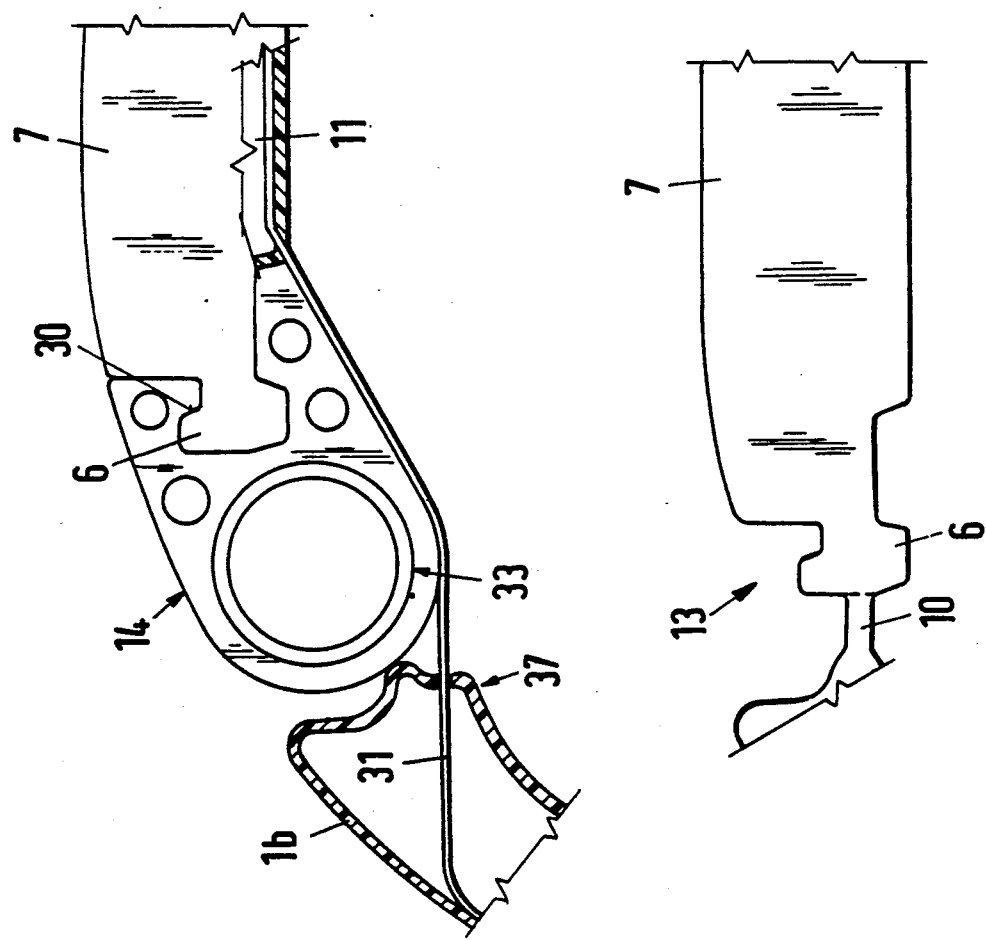
Fig.-4

TRANSPORTABLE, DISASSEMBLABLE CABIN

BACKGROUND OF THE INVENTION

The present invention relates to a cabin comprising several wall segments and optionally at least one ceiling segment and one floor segment and which can be assembled to form a substantially closed cabin. The invention also relates to a method for the manufacture of a cabin assembled from several segments.

Cabins assembled from several segments, e.g. used as portable chemical toilet cabins which can be erected rapidly are known. These essentially consist of four wall panels or plates, a floor and a ceiling plate or panel, said parts being riveted together to form a parallelepipedic cabin.

The manufacture and also the assembly of such cabins is relatively complicated, because special tools, e.g. riveting tools are needed. The segments of the known cabins comprise substantially planar plastic plates or panels and are consequently not torsionally rigid and stable in their corner joints. In addition, it is only possible with a certain difficulty to disassemble such cabins by drilling out the individual riveted connections. Thus, once they have been assembled, such cabins are usually left in the assembled state, which increases space requirements during the transportation to the different points of installation.

SUMMARY OF THE INVENTION

Compared with this prior art the problem of the present invention is to provide a cabin with the aforementioned features and a method for the manufacture of such a cabin, which greatly simplifies manufacture and permits a greatly simplified cabin assembly, whilst simultaneously ensuring that the components are held together in a stable and relative torsionally rigid manner, whilst giving the cabin an attractive external appearance. Simultaneously, the cabin should also be easy to disassemble and easy to transport.

With regards to the method this problem is solved in that the segments from which the cabin is assembled. are at least partly manufactured as demoldable hollow blow moldings with a substantially identical, external ground plan.

The manufacture of the segments as hollow blow moldings or parts greatly speeds up the production process, the construction as a hollow blow molding leading to a large number of further advantages. The hollow blow moldings can be manufactured in a relatively dimensionally stable manner and as double-walled parts act in a heat and sound insulating manner.

The term "hollow blow molding" is understood to mean a production process, in which a varyingly large "drop" or lump from a fluid plastic material is located at a nozzle opening, introduced into a cavity with the desired negative shape and is blown up from the inside, so that the plastic material is applied to the mold walls from the inside. Particularly in the case of large molded parts, it is also possible to introduce several "drops" into a mold and which, following blowing up, form a one-piece, cohesive molding with several separate cavities.

Plastic cabins are already known, whose walls are generally not formed from segments and which are produced according to a centrifuging process. However, the corresponding molds are not very durable, so that only relatively small numbers can be produced. In addition, in said production process, the plastic material is heated twice to a relatively high temperature and is consequently correspondingly stressed. The segmentation of the cabin has the advantage that optionally one and the same mold or a part thereof can be successively used for several segments of a cabin. This reduces mold costs, which are generally considerable. An important element of the invention is that the cabin not only comprises several individual segments, but that said segments can be very rapidly and simply assembled and then rapidly disassembled again, e.g. for transportation to another installation point.

A further advantage of hollow blow molding or parts is their stability as double-walled parts, so that there is no need for an additional supporting frame or individual supporting elements, e.g. of metal.

In order to facilitate the further production, i.e. the assembly of the cabin, according to the invention three wall segments forming the outer cabin wall are assembled by groove and tongue joints and are provided with at least one substantially horizontal, all-round tension or tightening strap. This type of the connection permits a particularly rapid assembly and disassembly of the cabin segments, so that they are reliably held together in the assembled state.

According to a special development of the inventive method the door of the cabin is manufactured in one piece with the associated wall segment and as a hollow blow molding, the door having a cavity separate from the remaining wall segment and is linked with the remaining wall segments by means of a substantially solid web, the door being separated from the segment along the web, accompanied by the formation of a door opening. This obviates the need for separately manufacturing the door, which is consequently simultaneously manufactured in a mold with an associated wall segment. This simultaneously avoids waste, which would otherwise result from the cutting out of a door opening, or an additional mold for the segment with the door opening. The door wall segment can also be used as a normal wall segment without a door opening. This makes it unnecessary to manufacture additional hollow blow molds.

Preference is given to an embodiment of the invention, in which the door is separated from the wall segment along a completely, all-round web, is provided on one longitudinal edge with at least one hinge element and is inserted with overlap in the resulting wall opening displaced substantially by the hinge element width, the hinge element being fixed to the facing edge of the wall segment door opening.

With respect to the actual cabin, which comprises several wall segments and optionally also a ceiling and a floor segment and which can be assembled to form a substantially closed cabin, the problem of the invention is solved in that at least part of the wall segments comprises a first wall part which is substantially straight at least on its outside in ground plan and at least one second wall part firmly connected to the first wall part and which is bent at an angle thereto of max. 90°. Preferably these two wall parts are manufactured as a onepiece, bent wall segment. This bent construction of the individual wall segments, which when assembled give the outer cabin wall, permits a very rapid and reliable assembly, so as to give a very stable, torsionally rigid cabin as a result of the parts of different wall segments being firmly connected under an angle. This also has the advantage that they can be disassembled into their segments and therefore easily transported.

In place of the segments comprising at least two wall parts and with a fixed angle between said two wall parts, according to an alternative embodiment of the invention it is possible to use simple planar segments comprising a single wall part if, on the inside thereof, is provided a molding, e.g. in the form of a floor or ceiling segment, which also unchangeably predetermines the relative angle between the individual wall segments and in which the segments are held together from the outside by a tension strap and are pressed against the inner molding.

Preference is obviously given to a combination of the two aforementioned embodiments.

According to the invention at least one part of the wall segments is manufactured as a hollow blow part. Hollow blow parts or moldings have the aforementioned advantageous characteristics with regards to their manufacture and also with regards to the strength attainable for a comparatively low weight, so that the cabin is correspondingly stable and at the same time light, which again facilitates transportation. A suitable hollow blow molding material is e.g. polyethylene, which even in the cold has a good impact strength.

Preference is given to an embodiment of the invention in which part of the segments have on the inside the same basic shape or basic ground plan as on the outside. In conjunction with the forming of the parts of a wall segment bent at an angle of less than 90°, it is possible in this way to stack the wall segments in space saving manner, in that one wall segment is placed with its outside on the inside of another wall segment, because said inside has substantially the same basic shape.

Preference is generally given to a cabin embodiment, in which the individual wall segments from which the cabin is assembled are stacked in this way.

However, at least one part of the wall segments should have additional elements shaped onto the inside and whose walls form, from the visible inside, an angle of at least approximately 60° or more with the inner surface of the first and/or second wall part. Through the arrangement of additional elements on the inner surface of a wall segment admittedly the stackability is impaired, but as said additional elements are restricted to a part and preferably only a single wall segment, initially all the other walls segments can be stacked upon one another and finally the wall segment with additional elements shaped onto the inside is placed on the stack. In order to simultaneously ensure manufacture as a hollow blow molding, the walls of the additional elements must not form an excessively small angle with the inner surface of the first and/or second wall part, because otherwise it would not be possible to ensure the demoldability of such parts. Generally, during blow molding, two molded parts are engaged with one another, accompanied by the formation of one or more gaps between them. So that after the blowing out of the thus formed cavities, it is possible to remove the molds without destroying or damaging the hollow blow molding produced, the two mold halves must not have any undercut projections in the demolding direction, i.e. the direction in which the molds are drawn apart. As a result of the aforementioned minimum condition with respect to the angle between the walls of the additional elements and the wall parts of the segment, such undercut molds can be avoided and in individual cases the angle could also be smaller, as a function of the demolding direction. In other words the additional elements or their walls must be shaped in such a way that there is at least one viewing direction (which then also corresponds to the demolding direction), from which none of the walls of the additional elements appears undercut. Thus, from this viewing direction, all the walls of the additional elements and also the insides of the wall parts of the wall segment are visible or at the most run parallel to the viewing direction. When using a more or less elastic material, it is possible to accept smaller undercuts, because the corresponding walls yield elastically during demolding.

In order to on the one hand ensure this demoldability and in order to simultaneously reduce the number of wall segments necessary, each wall segment has second wall parts fitted to opposite edges of the first wall part and in the case of additional elements optionally shaped onto the inside of the wall segment, the angle formed between the walls of said additional element and the first and/or second wall parts is min. approximately 90°.

Preference is also given to an embodiment of the invention, in which the assembled wall segments are held together by at least all-round tightening or tension strap. As has already been stated, holding together with the aid of such a tension strap leads to a very rapid assembly and disassembly of the cabin and simultaneously ensures that the wall segments are firmly held together. Assembly and disassembly can also take place without any use of tools.

Preference is given to an embodiment, in which the cabin has three wall segments, which comprise in each case one first wall part which is substantially planar on the outside, as well as second wall parts bent at 60° thereto and which in each case have roughly half the width of the first wall part.

The 60° angle of the wall parts of each wall segment contributes significantly to the stabilization of the individual wall segments, and therefore also to the complete cabin. As is readily apparent, a cabin exclusively comprising these three wall segments and accompanied by the formation of a cabin with the ground plan of a regular hexagon can be engaged with said second side parts. The second side parts of abutting wall segments are aligned. The regular hexagon shape then necessarily arises due to the angles of in each case 60° formed between the first and second wall parts and the fact that the two abutting side parts of adjacent wall segments are aligned with one another and in each case have half the side length of a first wall part.

Advantageously the second wall parts of different segments can abut in a groove and tongue joint. In this way the individual wall segments are fixed to one another. Appropriately the wall segments are also provided close to their upper and/or lower edge with in each case one substantially horizontally directed depression or cavity for receiving in each case one tension strap. The arrangement of the straps on the upper and-/or lower edge of the cabin is also appropriate because in this way the passage through a door in the cabin wall is not impeded by the all-round strap. Optionally also a single upper or lower strap is sufficient, if e.g. on in each case opposite edges of the cabin the segments are held together by a ceiling or floor element.

In the case of the preferred cabin having three wall segments, two wall segments have substantially parallel inner and outer faces, one of said segments being provided with a door opening, whilst the third wall segment substantially has the same external shape, but additional elements shaped onto the inside. This embodiment permits the aforementioned space-saving stackability of the individual segments. According to an embodiment where the cabin is used as a toilet, according to the invention the additional element is constituted by a lavatory pan and/or at least one water tank or cistern and/or a water basin and/or a urinal.

According to the preferred embodiment, in addition to the wall segments the cabin has at least one floor segment and/or a ceiling segment Advantageously the floor segment is hexagonal, its external dimensions corresponding to the internal dimensions of the assembled wall segments and projections engaging in wall segment depressions being provided on the all-round edge of the floor segment. The floor segment is then firmly connected by said projections to the wall segments, so that the cabin can be raised as a whole without the floor segment dropping out.

Such a floor segment is in accordance with the aforementioned molded part and against which the wall segments are pressed by an all-round tension strap.

The floor segment is also preferably manufactured as a hollow blow molding and for use of the cabin as a toilet has a cavity constructed as a feces tank.

The substantially planar construction of the walls does not exclude profiling thereof in order to increase their stability, so that such an embodiment is preferred. When using a roof segment, the latter can advantageously have a snap edge or clips, which resiliently engage behind an upper edge of the wall segments. Thus, the roof segment firmly holds together the wall segments and is also reliably fixed to the latter, so that it cannot be torn away by strong winds or gales from the said wall segments. The snap edge need not pass all the way round and instead individual elastic snap hooks or tension hooks can be provided enabling the roof segment to be connected in simple, rapid manner to the wall segments. The roof segment is also preferably provided with ventilation slots and/or window inserts.

The door of the cabin is also manufactured as a hollow blow molding in the preferred embodiment, being provided on one edge with a hinge element and overlapping with its facing edge the margin of a door opening. With regards to the door manufacture, the same advantages as obtained with the manufacture of the individual wall segments occur.

Appropriately the hinge edge of the door has an undercut profiled rail parallel to the door edge and which can be inserted in a matching hollow profile of at least one hinge element. This measure also simplifies the manufacturing process.

It is also appropriate to provide on the door and the associated wall segment a spring element, which pretensions the door into the closed position. In order to facilitate the fitting of the door to the cabin or the corresponding door opening, according to the invention in the floor segment and/or in the ceiling segment recesses are provided for receiving hinge pins. This can also obviate the need for fixing additional hinge elements to the margin of the door opening.

The invention is described in greater detail hereinafter relative to a preferred embodiment and the attached drawings, wherein show:

BRIEF DESCRIPTION OF THE DRAWINGS

FIG. 4 diagrammatically the construction of the door segment immediately following the manufacture as a hollow blow molding and in the fitted state with a hinge.

DETAILED DESCRIPTION OF THE PREFERRED EMBODIMENTS

Figure 1:
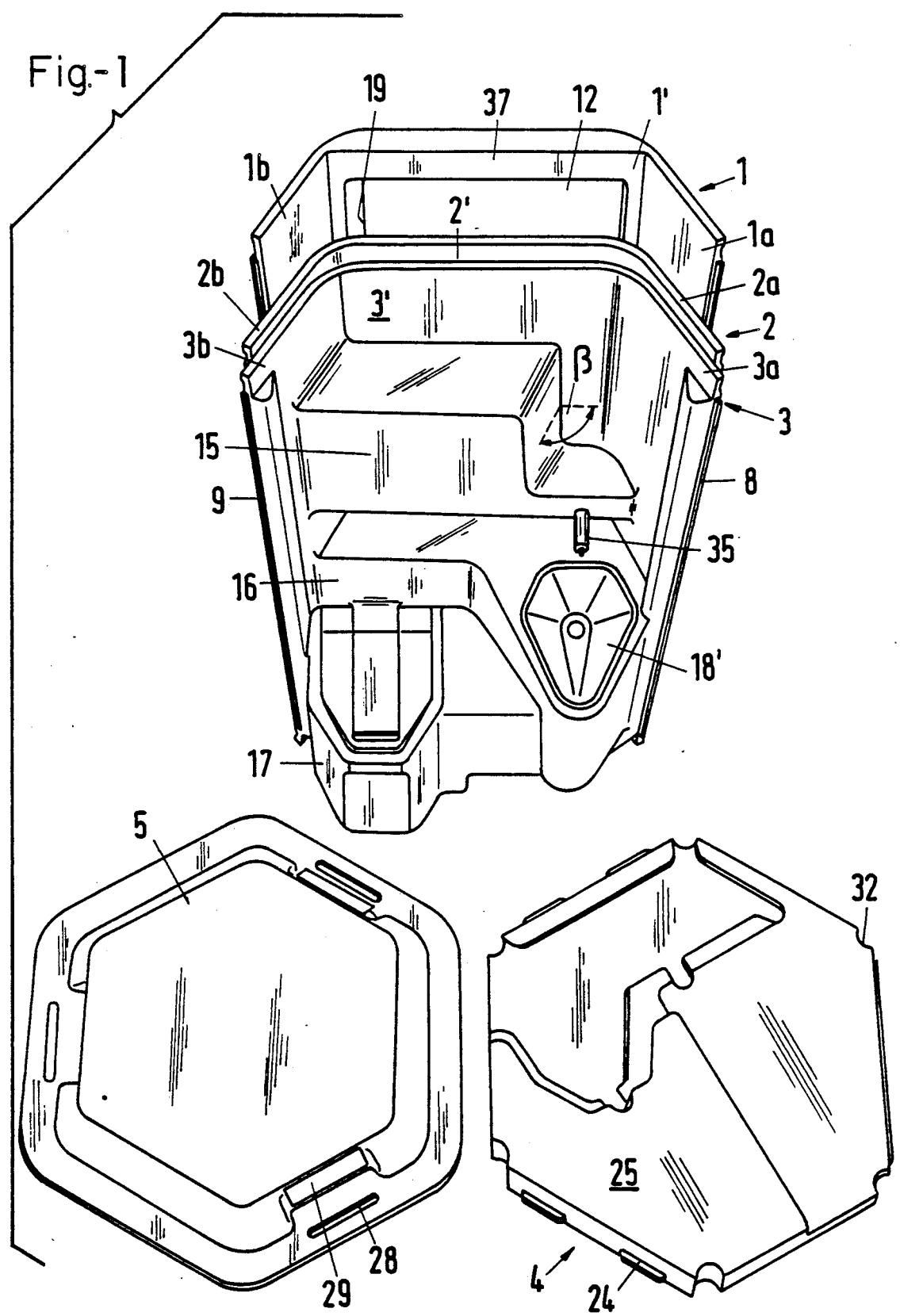
FIG. 1 the five segments forming a cabin, the three wall segments being stacked behind one another.

FIG. 1 shows three successively arranged wall segments 1,2,3, as well as a ceiling segment 5 and a floor segment 4. The individual wall segments 1,2,3 in each case comprise a straight, first wall part 1', 2', 3', which is substantially planar at least on its outside and two second wall parts 1a,1b; 2a,2b; 3a,3b fitted on either side to the first wall part under an angle of approximately 60°. The wall part 1' of the segment 1 has a door opening 12. The inner wall of the wall segment 1, apart from profiling effects, runs in the same way as the inner wall of the wall segment 2 parallel to the particular outer wall of the wall segment 1 or 2. However, the wall segment 3 is provided on its inside with one-piece, shaped-on additional elements constituting a water tank 15, a further water tank 16, a lavatory pan 17 and a combination container 18. Additionally fitted parts are the toilet cover 34, water tap 35 and urinal 18', which can be replaced by a wash basin and which are more clearly visible in FIG. 2.

As is readily apparent the walls e.g. the wall 15' of the additional elements form with the inner walls of the wall segment 3 angles $\alpha$ and $\beta$ which are at least 90°. The walls of the additional elements also abut with one another and angles of at least 90°, which ensures easy demoldability. However, wherever depressions are required, such as e.g. for the urinal 18', openings are left free or cut out in the additional part and then the corresponding inserts can be placed therein, much the same applying with regards to the lavatory pan 17.

The second wall parts 1a,b; 2a,b and 3a,b are assembled by means of groove and tongue joints and in this case the second wall parts designated a have the tongue 8 and the second wall parts designated b the corresponding groove 9.

Figure 2:
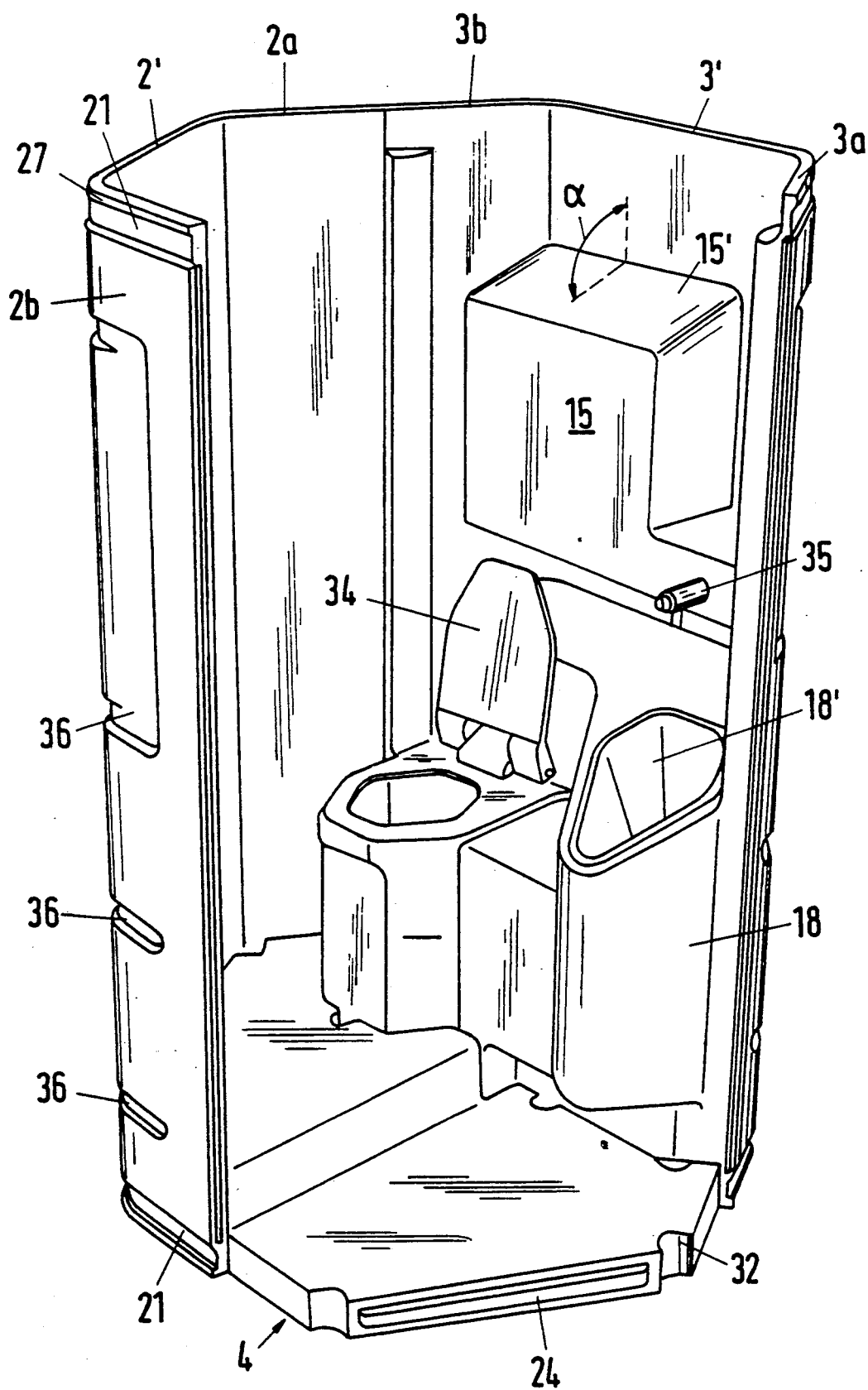
FIG. 2 a cabin partly assembled from a floor segment and two wall segments.
Figure 3:
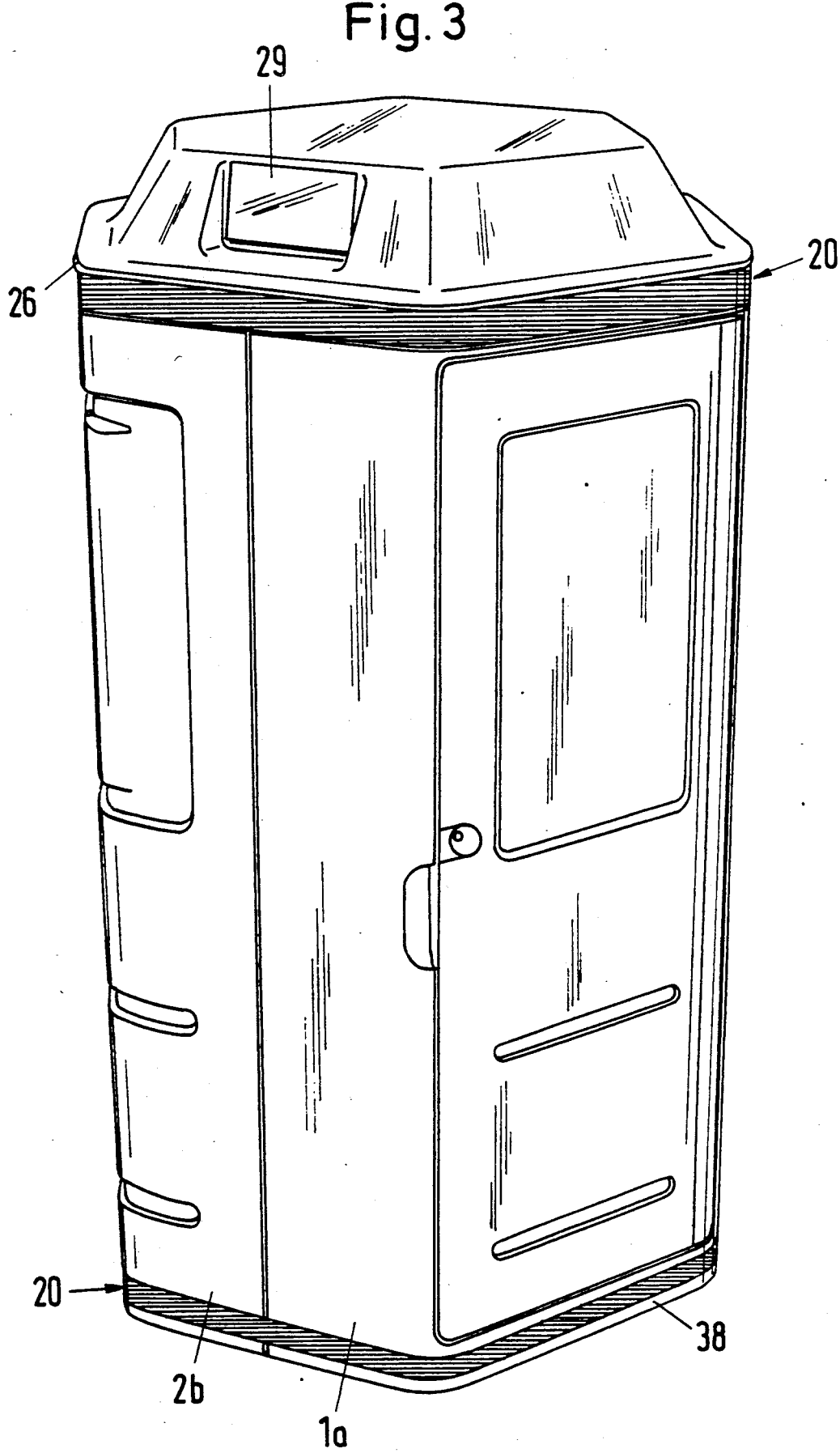
FIG. 3 a completely assembled cabin in an outside view.

FIG. 2 shows further additional features of the cabin, such as e.g. the depressions 21 on the upper and lower edge of the wall segments 1,2 and 3, which when the cabin is assembled form a horizontally directed groove or depression for receiving a tension strap 20, as shown in FIG. 3. It is also possible to see on the outside wall of the wall segments 2 and 3 profile effects 36, which serve to increase stability and are also advantageous with regards to the design.

The all-round edge of the floor segment 4 has projections 24 partly visible in FIG. 1 and partly visible in FIG. 2. The longer projection 24 visible in FIG. 2 can engage in a corresponding depression on the lower edge of a first wall part, in this case wall part 1', whereas the shorter projections 24, two of which are shown on the edge of the floor segment 4 in FIG. 1, can in each case engage in a corresponding depression of the shorter, second wall parts.

In the vicinity of the lavatory pan 17, the floor segment is raised and below said raised section has a feces tank 25.

FIG. 3 shows a completely assembled cabin from the outside, the ceiling segment 5 engaging with its outer snap edge 26 behind the upper edge 27 of the wall segment visible in FIG. 2. In the depression 21 below the same is provided a tension strap 20, as in the lower depression 21. The tension strap can be riveted, crimped or detachably tensioned. A particular advantage of this tensioning procedure in connection with the wall segments is that the engaging wall segments abut in such a way that in each case two second wall segments, e.g. 1a,2b; 2a,3b and 3a,1b are aligned. On tightening the tension strap said connection is exclusively pressurized without any torque with respect to the tongue and groove joint. Thus, there is no possibility of the engaging second wall parts tilting about the axis defined by the groove and tongue joint. Where the wall parts are at an angle of 60° to one another, the parts are constructed in one piece with one another, so that there is also no risk here of any twisting or deformation of the cabin under the tension of the strap 20. Advantageously, the ground plan of the floor segment 4 is adapted to the internal dimensions of the assembled wall segments, so that under the tension of the lower strap 20 the segments are all held together in a very stable manner. The ceiling segment 5 can also be provided on its underside with a shoulder corresponding to internal dimensions of the wall segments 1,2,3 and against which can engage the upper inner surface of the wall segments under the tension of the strap 20.

FIG. 3 clearly shows window inserts 29 in the ceiling segment 5, whereas the ventilation slots 28 thereof are more clearly visible in FIG. 1.

The lower part of FIG. 4 shows in detail and interrupted form the wall segment 1 with the door 7 constructed in one piece therewith. The door 7 has its own, separate cavity 11 and is connected by means of solid, non-hollow webs 10 to the edges 23 and 19 of the wall segment 1 or the wall part 1', which after the separation of the door 7 form two facing inner edges of a door opening 12. The cavity 11 of the door can be seen through the top thereof shown in partly broken away form.

As is clear from a comparison of the contours in the lower and upper portions of FIG. 4, the door 7 is separated from the webs 10 immediately at its front edge 22 and immediately behind the rear profiled rail 6 and then the webs 10 can subsequently be removed from the opposite edges 23 or 19 of the door opening 12. A hinge element 14, which has a hollow profile 30 corresponding to the profiled rail or member 6, can be engaged from above or below on said rail 6. The hinge element can either extend over the entire length of the profiled rail 6, or two or more short hinge elements 14 can be engaged thereon from above or below. The door 7 with the hinge element 14 is then so inserted in the door opening 12 that the hinge element 14 is located directly in front of the edge 19 of the door opening 12. The hinge element can either be fixed to the inner edge 19 of the door opening or according to the preferred embodiment has in each case an upper and a lower hinge pin 33, which can also be continuous, the lower hinge pin engaging in a recess 32 on the floor segment 4, better visible in FIG. 2, and a facing, not shown recess in the lower crossbeam 38 of the door opening 12. The upper hinge pin 33 engages in a corresponding opening in the upper crossarm 37 of the door opening 12. The ceiling element 5 can also optionally have a recess corresponding to that 32 of the floor segment 4. A spring element 31 connected to the wall part 1 or the immediately following wall part 1b and which engages with a second end on the door 7, pre-tensions the door into the closed position. As a result of the arrangement of the hinge element 14, which is wider than the web 10 which previously passed between the profiled rail 6 and the edge 19 of the door opening 12, the door is so displaced towards the door margin 23, that its edge 22 overlaps the margin 23, so that the stop face 22' of the door edge 22 strikes against the stop face 23' of the margin 23.

As can be gathered from the drawings, the plastic cabin has rounded corners and, as can in particular be gathered from FIG. 3 has a correspondingly attractive external appearance. This attractive exterior is linked with a high degree of functionality. The cabin can be very easily assembled and then disassembled again, the individual wall segments, as shown in FIG. 1, are stacked upon one another, so that the transportation of such cabins is considerably facilitated, and the cabin held together by the tension straps is extremely stable and strong.

I claim:

1. An easily assemblable and disassemblable lavatory cabin which comprises:
   a plurality of wall segments each having at least one first substantially straight wall part having inside and outside surfaces and which is substantially planar on its outside surface, and each wall segment having at least one second wall part connected to said first wall part and formed at an angle of 90° or less relative to said first wall part; and
   at least one tension strap extending around the exterior surfaces of said wall segments securing said wall segments together to form said lavatory cabin.

2. A cabin as claimed in claim 11 wherein at least a part of said wall segments are double-walled manufactured by hollow blow molding.

3. A cabin as claimed in claim 1 wherein at least one wall segment has substantially the same ground plan on the inside surface of said wall segment as on the outside surface thereof.

4. A cabin as claimed in claim 1 wherein said wall segments are stackable so that the outside of one wall segment can be placed in a substantially matching manner on the inside of another wall segment.

5. A cabin as claimed in claim 4 wherein one wall segment includes one or more additional elements formed on the inner surface thereof, said one or more additional elements comprising a lavatory pan, a water tank, a wash basin, or a urinal.

6. A cabin as claimed in claim 1 wherein each of said wall segments includes a first wall part and two second wall parts, said second wall parts located on opposite edges of said first wall part, and wherein the angle formed between said first and second wall parts is about 60°.

7. A cabin as claimed in claim 6 comprising three wall segments, each having one first wall part which is substantially planar on its outside surface and two second wall parts forming angles of 60° relative to said first wall part, said second wall parts being approximately one half the width of said first wall part.

8. A cabin as claimed in claim 7 wherein said wall segments are joined together at said second wall parts to form a cabin with the ground plan of a regular hexagon.

9. A cabin as claimed in claim 8 wherein said second wall parts of said wall segments abut in a tongue and groove joint.

10. A cabin as claimed in claim 7 wherein two of said three wall segments have substantially parallel inner and outer surfaces, one of said two of said three wall segments having a door opening therein, and wherein the third of said three wall segments has substantially the same external shape and has one or more additional elements on the inner surface thereof.

11. A cabin as claimed in claim 10 wherein said one or more additional elements comprise a lavatory pan, a water tank, a wash basin, or a urinal.

12. A cabin as claimed in claim 10 further comprising a door, said door having a hinge element on one edge thereof and overlapping the margin of said door opening with its opposite edge.

13. A cabin as claimed in claim 12 wherein said one edge of said door has an undercut profiled rail parallel to said one edge adopted to be inserted into a matching hollow profile in at least one hinge element.

14. A cabin as claimed in claim 12 including a spring element provided on said door, said spring element pretensioning said door in the closed position.

15. A cabin as claimed in claim 12 including a plurality of recesses for receiving hinge pins located in either said floor segment, said one of said two of said three wall segments, or said ceiling segment.

16. A cabin as claimed in claim 1 further comprising a floor segment.

17. A cabin as claimed in claim 16 wherein said floor segment corresponds to the internal dimensions of said wall segments when assembled, and wherein said floor segment includes a plurality of projections which engage depressions at the base of the inner surfaces of said wall segments to connect said floor segment to said wall segments.

18. A cabin as claimed in claim 17 wherein said floor segment is produced by hollow blow molding and has a cavity constructed therein which serves as a feces tank.

19. A cabin as claimed in claim 16 further comprising a ceiling segment.

20. A cabin as claimed in claim 19 wherein each of said wall segments include an upper edge and said ceiling segment includes means for resiliently engaging each of said upper edges of said wall segments to attach said ceiling segment to said wall segments.

21. A cabin as claimed in claim 20 wherein said ceiling segment includes ventilation slots or window inserts.

22. A cabin as claimed in claim 1 wherein said wall segments include a substantially horizontally directed depression adjacent at least one of the top or bottom edges of said wall segments with said tension strap positioned in said depression securing said wall segments together.

23. An easily assemblable and disassemblable lavatory cabin which comprises:
a plurality of substantially straight wall segments having inside and outside surfaces, respectively;
at least one tension strap extending around the outside surfaces of said wall segments; and
ceiling and floor segments, wherein at least one of said ceiling and floor segments include means for engaging said inside surfaces of said wall segments such that said inside surfaces of said wall segments are pressed against said engaging means by said tension strap.

24. A cabin as claimed in claim 23 in which said engaging means on said floor segment comprises a plurality of projections and wherein said projections mate with a plurality of corresponding depressions on the inside surfaces of said wall segments.

25. A cabin as claimed in claim 23 in which said engaging means on said ceiling segment comprises a shoulder on the underside thereof corresponding to the internal dimensions of said wall segments and which engages the inside surfaces of said wall segments.

26. A cabin as claimed in claim 23 in which two tension straps are provided, one of said tension straps being located adjacent the upper edge of said wall segments and the other of said tension straps being located adjacent the lower edge of said wall segments.

27. A cabin as claimed in claim 23 in which at least some of said wall segments have substantially the same ground plan on the inside surface of said wall segments as on the outside surfaces tehreof so that the outside surface of one wall segment can be placed in substantially matching manner on the inside surface of another wall segment to stack said segments for transport.

* * * * *

UNITED STATES PATENT AND TRADEMARK OFFICE
CERTIFICATE OF CORRECTION

PATENT NO. : 5,093,941
DATED : March 10, 1992
INVENTOR(S) : Harald G. Muller It is certified that error appears in the above-identified patent and that said Letters Patent is hereby corrected as shown below:

Col. 8, Line 33 "claim 11" should be-- "claim 1"
Col. 10, Line 40 "surfaces tehreof" should be-- "surfaces thereof"

Signed and Sealed this

Tenth Day of August, 1993

Attest:

MICHAEL K. KIRK

Attesting Officer     Acting Commissioner of Patents and Trademarks